(12) United States Patent
Itzkovitz et al.

(10) Patent No.: US 6,263,414 B1
(45) Date of Patent: Jul. 17, 2001

(54) MEMORY FOR ACCOMPLISHING LOWERED GRANULARITY OF A DISTRIBUTED SHARED MEMORY

(75) Inventors: Ayal Itzkovitz; Assaf Schuster, both of Haifa (IL)

(73) Assignee: Technion Research and Development Foundation, Ltd., Haifa (IL)

( * ) Notice: Subject to any disclaimer, the term of this patent is extended or adjusted under 35 U.S.C. 154(b) by 0 days.

(21) Appl. No.: 09/161,810

(22) Filed: Sep. 28, 1998

Related U.S. Application Data

(60) Provisional application No. 60/093,232, filed on Jul. 17, 1998.

(51) Int. Cl.[7] .............................. G06F 12/00; G06F 13/00

(52) U.S. Cl. ...................... 711/203; 711/100; 711/147; 711/150

(58) Field of Search ..................................... 711/100, 147, 711/203, 209, 150; 710/56, 15; 712/28

(56) References Cited

U.S. PATENT DOCUMENTS

| | | | |
|---|---|---|---|
| 5,428,803 | * | 6/1995 | Chen et al. ............................... 712/6 |
| 5,522,045 | * | 5/1996 | Sandberg ............................ 709/215 |
| 5,592,625 | * | 1/1997 | Sandberg ............................ 711/147 |
| 5,617,537 | * | 4/1997 | Yamada et al. ...................... 709/214 |
| 5,625,831 | * | 4/1997 | Priest et al. .......................... 713/500 |
| 5,974,536 | * | 10/1999 | Richardson .......................... 712/215 |
| 6,021,479 | * | 2/2000 | Stevens ................................. 711/170 |
| 6,049,853 | * | 4/2000 | Kingsbury et al. .................. 711/147 |
| 6,055,605 | * | 4/2000 | Sharma et al. ....................... 711/130 |
| 6,055,617 | * | 4/2000 | Kingsbury ............................ 711/203 |
| 6,085,263 | * | 7/2000 | Sharma et al. ......................... 710/56 |

OTHER PUBLICATIONS

Design of the Munin Distributed Shared Memory System, John B. Carter; Journal of Parallel and Distributed Computing, 29, 219–227 (1995).

A Dynamic Cache Sub–block Design to Reduce False Sharing, Murali Kadiyala and Laxmi N. Bhuyan; Publication Date: Feb. 10, 1995.

Two–Tier Paging and Its Performance Analysis for Network–based Distributed Shared Memory Systems, Chi–Jiunn Jou, Hasan S. Alkhatib and Qiang Li; 2334D IEICE Transacitons on Information and Systems; E78–D(1995) Aug., No. 8, Tokyo JP.

MGS: A Multigrain Shared Memory System, Donald Yeung, John Kubiatowicz and Anant Agarwal; Laboratory for Computer Science, Massachusetts Insitutute of Technology, Cambridge, MA 02139. Publication Date, May 22, 1996.

Using Fine–Grain Threads and Run–Time Decision Making in Parallel Computer; David K. Lowenthal, Vincent W. Freeh, and Gregory R. Andrews;' Journal of Parallel and Distributed Computer 37, 41–54 (1996), Article No. 0106.

(List continued on next page.)

Primary Examiner—Tuan V. Thai
(74) Attorney, Agent, or Firm—Knobbe, Martens, Olson & Bear, LLP

(57) ABSTRACT

A Distributed Shared Memory (DSM) system that provides a single address space shared by a number of processes The DSM is capable of accomplishing lowered granularity of distributed shared memory. The DSM system includes the address space constituting a virtual address space that includes virtual pages. Two or more virtual pages in the virtual address space are mapped to the same memory page that includes one page. The page includes two or more minipages. There is further provided an assignor assigning independently, through the virtual pages, access permission to minipages that reside in the same page of the memory object. There is further provided processor processing independently in different processes minipages that reside in the same page.

4 Claims, 6 Drawing Sheets

OTHER PUBLICATIONS

A Performance Study on Bounteous Transfer in Multiprocessor Sectored Caches, Kuang–Chih Liu, Chung–ta King; The Journal of Supercomputing, 11, 405–420 (1997).

Shadow Stacks—A Hardware–Supported DSM for Objects of any Granularity, S. Groh, M. Pizka, J. Rudolph; München, Germany, 1997 IEEE.

Pet Keleher et al.; "TreadMarks: Distributed Shared Memory on Standard Workstations and Operating Systems," Chapter 4: Distributed Shared Memory Implementations at the Software Level; Department of Computer Science, Rice University; pp. 211–227.

Kai Li; "IVY: A Shared Virtual Memory System for Parallel Computing;" Chapter 4: Distributed Shared Memory Implementations at the Software Level; Department of Computer Science, Princeton University; pp. 121–128.

John B. Carter et al.; "Implementation and Performance of Munin;" Chapter 4: Distributed Shared Memory Implementations at the Software Level; Computer Systems Laboratory, Rice University; pp. 129–141.

Ioannis Schoinas et al.; "Fine–grain Access Control for Distributed Shared Memory;" Distributed Shared Memory; Computer Sciences Department, University of Wisconsin–Madison; pp. 228–237.

Daniel J. Scales and Kourosh Gharachorioo et al,; "Shasta: A Low Overhead, Software–Only Approach for Supporting Fine–Grain Shared Memory;" Operating Systems Review; vol. 30, No. 5; pp. 174–185 (Dec., 1996).

* cited by examiner

MEMORY FOR ACCOMPLISHING LOWERED GRANULARITY OF A DISTRIBUTED SHARED MEMORY

This application claims the priority of a provisional application Ser. No. 60/093,232, filed on Jul. 17, 1998.

FIELD OF THE INVENTION

The present invention is in the general field of Distributed Virtual Shared Memory.

BACKGROUND OF THE INVENTION

There follows a glossary of terms, some of which are conventional and others have been coined. A page is the continuous block of data handled by the operating system and the underlying machine architecture. A page constitutes a page of memory (e.g. residing in primary or secondary memory of a computer), however this is not obligatory and accordingly by way of non-limiting example a page may constitute e.g. a portion of a file. A virtual page is a page of virtual memory.

A DSM is a software layer which provides the illusion of shared memory on a distributed environment of hosts (computers, machines, PCs, workstations etc.), this concept is further described below. An application is the program which is using the DSM. A data item is a basic memory element that is used by the application. Typical, yet not exclusive examples of data item are a variable which is declared by the application, a set of variables (e.g., a structure or a few fields inside a structure) etc. The term data item encompasses data of any type and of any given size usable by an application.

A memory object is a continuous block of data that is capable of being mapped to virtual memory. Typical yet not exclusive examples of continuous memory being one or more pages of memory; or one or more file pages (the latter being section of file in the size of page or pages). The size of memory object equals normally k times (k integer) the size of a page. Until a memory object is mapped to virtual memory, it is not accessible to the application, namely, data cannot be read from or written to the memory object.

After the memory object is mapped to the virtual memory, data can be read from or written to the memory object by accessing the virtual memory provided, of course, that there is sufficient access permission.

There follows a description of virtual memory concept and mapping virtual addresses to a memory object.

The traditional notion of virtual memory allows the operating system in a host to (re)map virtual pages to physical pages. In this way, the memory can accommodate parts of the much larger virtual memory (address space), while these parts dynamically change according to the needs of the program, using the underlying hardware and operating system services. The basic mechanism ensures that different addresses in the virtual address space, are mapped to different physical addresses.

Distributed environments are composed of many hosts and an interconnection network. A Distributed Shared Memory (DSM) system provides a single address space shared by a number of processes which may reside on a number of hosts in a distributed environment. Any process can directly access any memory location in the address space. The DSM implements the mapping between each local memory and the shared virtual memory address space.

A shared virtual memory address space is partitioned into pages. According to one out of many possible pre-defined memory behaviors, a page has an exclusive copy, or has copies residing in the local memories of several hosts at the same time. These copies are marked with access permission rights, which typically include ReadOnly, ReadWrite, or NoAccess.

A memory reference (access) causes an access exception, also called a page fault, when the page containing the referenced memory address is marked as unavailable (via NoAccess), or when it does not have sufficient permissions for the type of access requested or access is prohibited (for instance: when there is an attempt to write a page which has ReadOnly permissions). When the exception is caught by the operating system, it invokes an exception handler which is implemented as part of the DSM system. When the memory location resides in a remote host, the handler retrieves the page containing this location (or its copy) from a remote host. The DSM (via the handler) communicates with the remote hosts, and when the page finally arrives it is copied to the memory page where the exception occurred. Access permissions are then changed and execution can resume.

By the above mechanism, access exceptions on pages that do not have a local copy usually cause the entire page to move between hosts. Even if the page contains several data items, only one of which is actually referenced, the whole page will be brought in. The reason for this is that the operating system and the underlying computer architecture provide protection (access permissions) in granularity of pages, which implies that if part of the page has certain access permissions, the remaining part must be open (or, blocked) for access with exactly the same permissions (restrictions).

There are two main problems with DSMs that work in granularity of full pages, as described above. First, the network traffic is a lot higher than actually required, due to redundant transfer of memory (which increases the message size). Second, when a memory page switches locations, it moves data items that are irrelevant to the serviced access exception, but may be required at the host where the page is originally found. This reduces the amount of parallelism in the system and decreases performance. The page is said to be falsely shared by the two hosts: each of them uses a different part of it, and yet they use the page exclusively (i.e., when one of them has the page and is accessing a certain data item, the other one cannot access the page and has to wait, although it only needs to access a different data item).

Known solutions have used compilers for lowering the granularity of DSMs, making it possible for them to work with smaller pages. The compiler essentially adds to each memory reference in the code additional instructions which check the availability of the accessed data on the local machine, thus avoiding using the page-based protection mechanism. However, execution of these additional instructions typically results in high overhead.

Modern operating systems provide mechanisms for binding virtual address space to a memory object. There follows a non-binding exemplary code for accomplishing the specified mapping utilizing a so-called section object primitive.

```
HANDLE os_create_object_sec(unsigned long obj_size)
{
HANDLE hObj = CreateFileMapping(
    (HANDLE)-1, NULL,
    PAGE_READWRITE | SEC_RESERVE, 0, obj_size, NULL);
return hObj;
}
void *os_map_mem_object(HANDLE hObj, void *reqaddr)
{
return MapViewOfFileEx(hObj,
FILE_MAP_ALL_ACCESS, 0, 0, 0, reqaddr);
}
void init( )
{
HANDLE hSecObj;
void *view1, *view2;
/*
create section object of size 3*4096 bytes (i.e 3 pages on Intel x86)
*/
hSecObj = os_create_object_sec(3*4096);
/*
map the section object to address 0x20000000 - 0x20002FFF
*/
view1 = os_map_mem_object(hSecObj, 0x20000000)
}
```

As shown, there are provided two functions. The first os_create_object_sec declares a section object (returning handler). A parameter for the specified function is the desired size. The second function os_map_mem_object accomplishes the actual mapping from virtual memory to memory object, utilizing the specified section object.

After duly declaring the function, their follows a short code illustrating mapping a memory object (by this particular embodiment being 3 pages size memory) to virtual address ranging across 0x2000000–0x20002FFF in the virtual address space.

The mechanism for mapping regions in the virtual address space to memory objects was originally provided in order to enable processes which reside at the same host to share data. The original idea is as follows. Let one process map a memory object to its virtual address space (using for example the specified section object). Another process can map a different virtual address space to the same memory object. As a result, both processes share the memory object via their respective virtual address spaces. Any modification of the object by one of them via its mapped region can be read immediately by the other one through its own mapped region.

One very important application of the multiple mapping idea described above is the Memory Mapped I/O mechanism. Using the mapping mechanisms, it is possible to map files and similar storage devices to the virtual address space of a process. Consequently, the operating system ensures that modifications to the mapped region are translated to modifications of the mapped file, as if the update has been directly performed on the file via the I/O interface.

Since accessing memory objects can only be done via the virtual memory to which they are mapped, handling them (e.g., changing access permissions) is also done in granularity of virtual memory pages. The inherent shortcomings of granularity of pages have been discussed above with reference to DSM.

There is accordingly a need in the art to provide for Fine-Grain Distributed Virtual Shared Memory which substantially reduce or eliminate the drawbacks of hitherto known Distributed Virtual Shared Memory systems.

SUMMARY OF THE INVENTION

According to one aspect, the present invention provides for: in a Distributed Shared Memory (DSM) system that provides a single address space shared by a number of processes;

A method for accomplishing lowered granularity of distributed shared memory, comprising the steps of:
(a) providing said address space as a virtual address space that includes virtual pages;
(b) mapping at least two virtual pages in said virtual address space to the same memory object that includes at least one page, said page includes at least two minipages;
(c) assigning independently, through said virtual pages, access permission to minipages that reside in the same page; and
(d) processing independently in different processes minipages that reside in the same page.

The present invention further provides for a Distributed Shared Memory (DSM) system that provides a single address space shared by a number of processes; the DSM is capable of accomplishing lowered granularity of distributed shared memory; the DSM system comprising:
said address space constituting a virtual address space that includes virtual pages;
at least two virtual pages in said virtual address space are mapped to the same memory object that includes at least one page, said page includes at least two minipages;
assignor assigning independently, through said virtual pages, access permission to minipages that reside in the same page of said memory object; and
processor processing independently in different processes minipages that reside in the same page.

The invention further provides for: in a Distributed Shared Memory (DSM) system that provides a single address space shared by a number of processes; the DSM is capable of accomplishing lowered granularity of distributed shared memory;
assignor assigning independently, through said virtual pages, access permission to minipages that reside in the same page.

Still further, the invention provides for: in a Distributed Shared Memory (DSM) system that provides a single address space shared by a number of processes, the DSM is capable of accomplishing lowered granularity of distributed shared memory;
processor processing independently in different processes minipages that reside in the same page.

The term minipage constitutes is a continuous portion of a page which includes (e.g. one or more data items) and which is handled like page insofar as permissions (e.g. admittance control, read, write) is concerned.

The term "processing" encompasses any manipulation of minipages including, but not limiting to accessing, modifying and copying.

Still further, the invention provides for, in a system that provides a single address space shared by a number of processes; a method for trapping access to memory, comprising the steps of:
(a) providing said address space as a virtual address space that includes virtual pages;
(b) mapping at least two virtual pages in said virtual address space to the same memory object that includes at least one page, said page includes at least two minipages;

(c) assigning no access permission to at least one minipage from among said minipages so as to constitute at least one protected minipage; and (d) trapping access to protected minipage in response to an attempt of a process to access said protected minipage.

According to yet another embodiment there is provided, in a system that provides a single address space shared by a number of processes; a method for providing substantially atomic access to memory, comprising the steps of:

a) providing said address space as a virtual address space that includes virtual pages;

b) mapping at least two virtual pages in said virtual address space to the same memory object that includes at least one page, said page includes at least one minipage; at least one of said virtual pages constituting a privileged page;

c) a process atomically accessing a minipage; said atomically accessing includes the following steps:

i) assigning no access permission to said minipage; said minipage constituting protected minipage;

ii) accessing the protected minipage through said privilege page; such that substantially simultaneous access by other processes to said minipage is prohibited; and iii) assigning permission other than no access to said protected minipage, thereby rendering said page not protected.

BRIEF DESCRIPTION OF THE DRAWINGS

For a better understanding the invention will now be described by way of example only with reference to the accompanying drawings, in which.

DESCRIPTION OF SPECIFIC EMBODIMENTS

Figure 1:
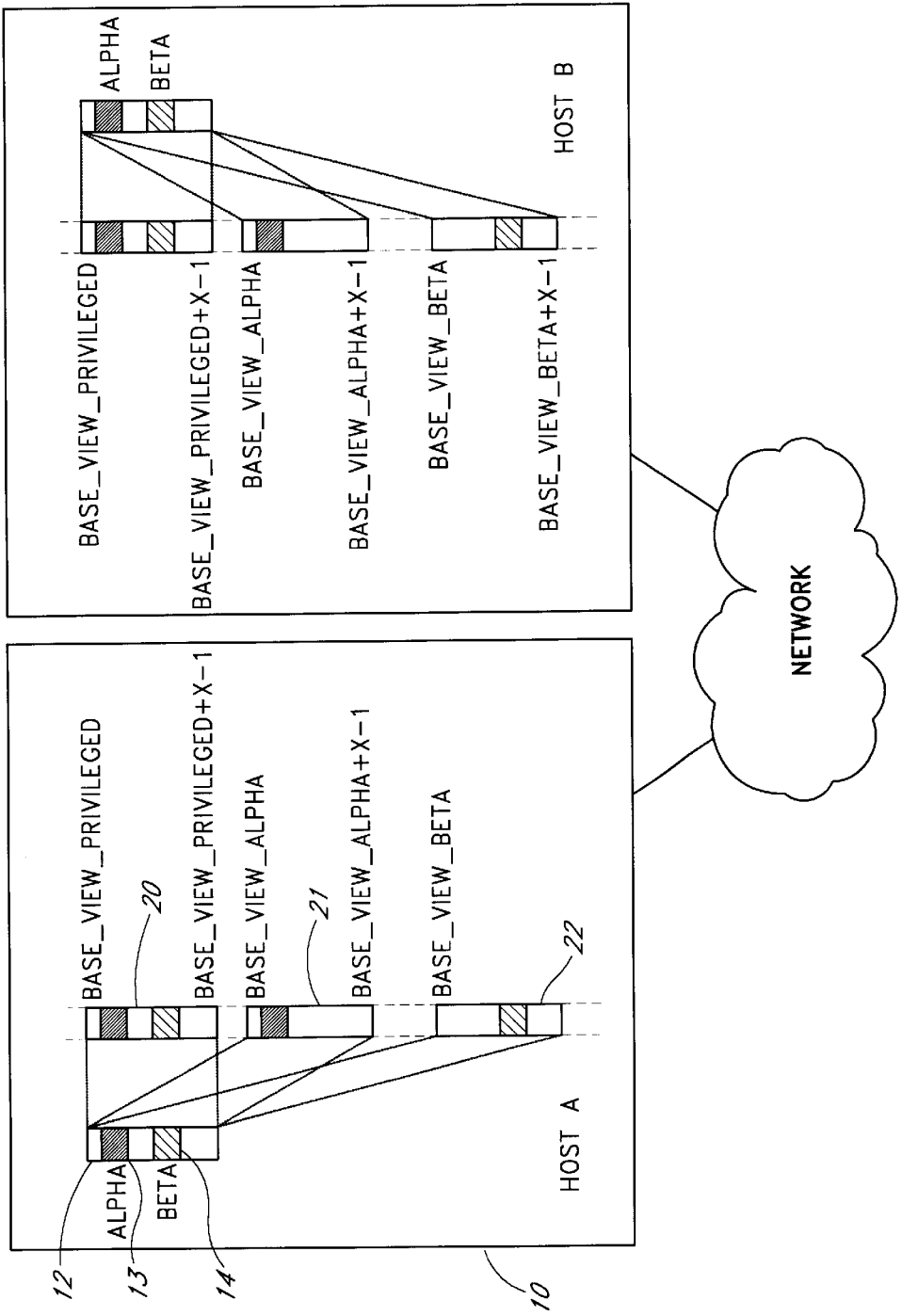
FIG. 1 illustrates an example of mini- page setup with two hosts, according to one embodiment of the invention.

It should be noted that for simplicity of explanation (which is by no means binding), it is assumed in describing the proposed method that a memory object has the size of a single page. Furthermore, (again for simplicity of explanation which should not be regarded as binding), it is assumed that there is a single memory object.

The system and method of the invention utilizes the mechanisms described above to implement fine grain DSM by using the built-in mechanism for mapping virtual memory address space to a memory object in order to implement a DSM which handles access permissions per minipages rather than per full pages. According to the invention the specified mechanism is extended for mapping two or more address spaces to the same memory object.

For a better understanding of the foregoing consider the following exemplary code with reference also to the example above.

```
/*
map the section object to address 0x20003000 - 0x20005FFF
*/
view2 = os_map_mem_object(hSecObj, 0x20003000);
/*
from now on, addresses 0x2000000 - 0x20002FFF and
addresses 0x20003000 - 0x20005FFF are mapped to the same
memory portion (represented by a section object). */ }
```

The net effect of the specified code is that the same memory object is mapped to a different virtual addresses ranging across 0x200003000–0x20005FFF.

All the minipages reside in the memory object. As explained above, the size of a minipage is independent of the page size. It can be as small as a byte, or as large as a page. It can be of equal size for all minipages, or can vary from one minipage to another, all depending upon the particular application. Thus, for example, each data item can be handled as a separate minipage, regardless of its size.

As will be explained in greater detail below, using the technique of the invention, the DSM may assign access permissions per minipage, independent of the access permissions given to other minipages, even some of them may reside on the same page. The DSM may also move minipages between hosts independent of the actual location of other minipages which may seem to reside on the same page. The details follow.

The basic technique is as follows. Consider a mapping of a region of virtual addresses to a memory object as a view. Using the mechanisms described above, it is possible to create in each process many views for a memory object. In the basic technique n+1 views are created for a memory object if the number of minipages in this memory object is n. Note that it is for the DSM to determine the value of n as well as the sizes of the minipages involved. This decision may depend on various parameters (for instance: on the pattern of memory allocations by the program).

Preferably, one of the views for each memory object is privileged. Each of the other views is associated with one of the minipages in the corresponding memory object. The views are non overlapping.

According to the specific example of mapping virtual pages to memory objects (by utilizing section object), the section object is declared during initialization time, then the views are created independently by each of the processes in the application. For simplicity, the views are called by the "name" of the associated minipage: a view corresponding to minipage M is called view_M by all processes. Preferably, (although not necessarily) the views associated with a specific minipage get the same virtual addresses in all the processes.

The privileged view of a memory object has all its access permissions enabled (i.e. ReadWrite). The other views of this memory object, each has its access permissions set according to the individual memory behavior of the associated minipage. Furthermore, the access permissions for a certain view of this memory object may be set differently at different processes according to the memory consistency that is maintained by the DSM for the associated minipage.

FIG. 1 shows an example of a system with two hosts, A (10) and B (11) (say, one process residing at each host).

It should be noted, that the term "host" and "process" used in the context of the description and claims should by no means be regarding as limited to any specific computing device and/or process executed in said device.

Reverting now to FIG. 1, a single memory object (12) is shown, containing two minipages called alpha (13) and beta (14). Three views (20, 21 and 22) are created at each of the hosts: a privileged view with ReadWrite access permissions, view_alpha, and view_beta (access rights for the latter two are not specified). Notice that by this particular example the views for each minipage are created in both hosts at the same virtual addresses (i.e. base_view_privilege, base_view_alpha and base_view_beta)

As described above, for each minipage in a memory object, there is a view of the memory object which is associated with this minipage. The association between minipages and views is established during initialization time or during memory allocation for the data items in the minipages. Once a data item is stored in a certain minipage, the application will always attempt to access this data item using the view associated with the minipage where this data item resides (namely, by referencing the virtual addresses of the associated view).

As long as the access permissions allow memory reference of the requested type, there is no need for the DSM to intervene in the operation of the operating system and the underlying hardware. Only upon violation of the access permissions does the operating system generate an access exception, which is caught by the exception handler of the DSM. It should be noted that page-faults which fetch the memory object from the disk are handled in the standard fashion by the operating system.

The exception handler uses the memory consistency protocol for this minipage. There are two possibilities (assuming that the program is not buggy) in which processing the minipage is required. In the first case, there exists an up-to-date local copy of the involved minipage and only protection should be changed (e.g. when the view is ReadOnly, the minipage is up-to-date, and there is an attempt to write the minipage). In this case, the exception handler simply grants the application access to this copy.

In the second case, there is no up-to-date local copy, so the exception handler sends out a request for the minipage or its copy to some remote host (the precise type of request and its destination are made according to the DSM internal protocols and the consistency protocol for this minipage). When the reply returns with the minipage contents, it is optional to the application to set temporarily the access permissions for the associated view to NoAccess, thus prohibiting access by the application. Then the minipage is written to the memory object by the DSM using the privileged view (writing the minipage means, obviously, modifying the section in the memory object where the minipage resides). Then the corresponding access permissions for the associated view are set to the required protection, the exception handler exits and the execution resumes. The access instruction that caused the exception man now execute successfully, since the minipage is updated and the access protection has been set.

Those versed in the art will readily appreciated that the specified two scenarios are only two out of many possible variants of "processing" the minipages.

Figure 2:
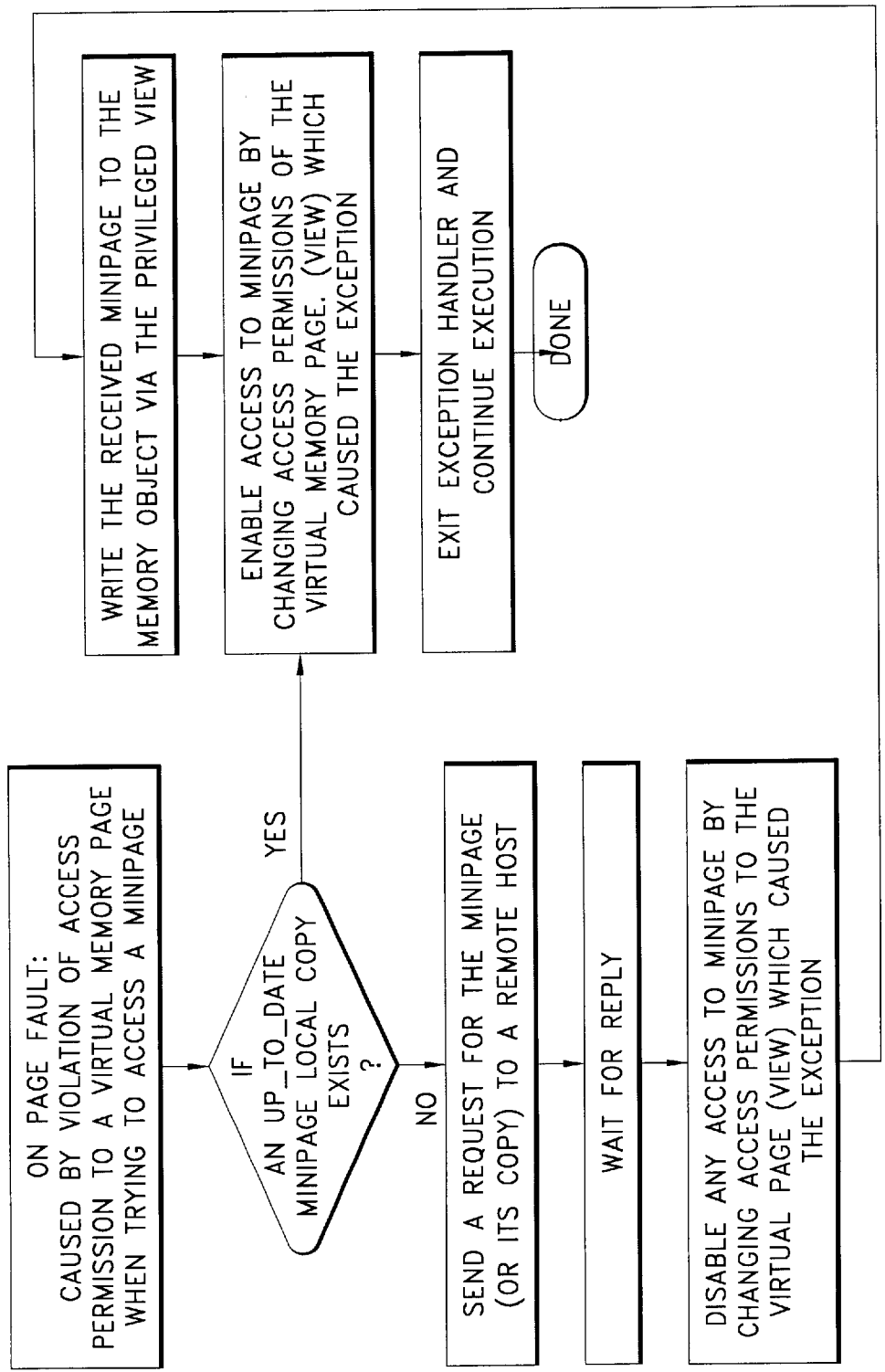
FIG. 2 illustrates a general flow chart for the actions performed by an exception handler, according to one embodiment of the invention.
Figure 3:
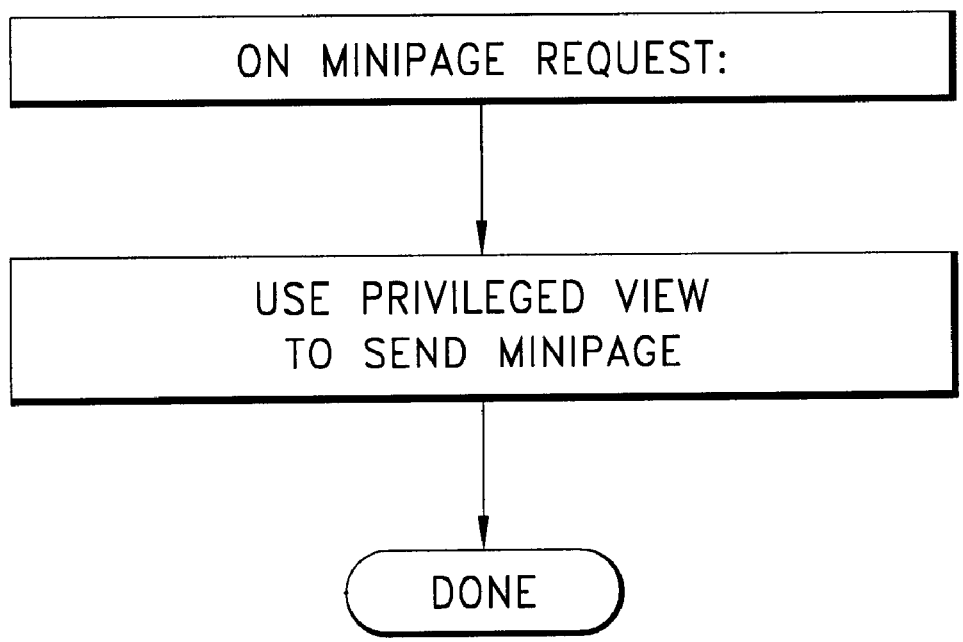
FIG. 3 illustrates a general flow chart for the actions performed by the host upon arrival of a request for a minipage or copy thereof, according to one embodiment of the invention.
Figure 4:
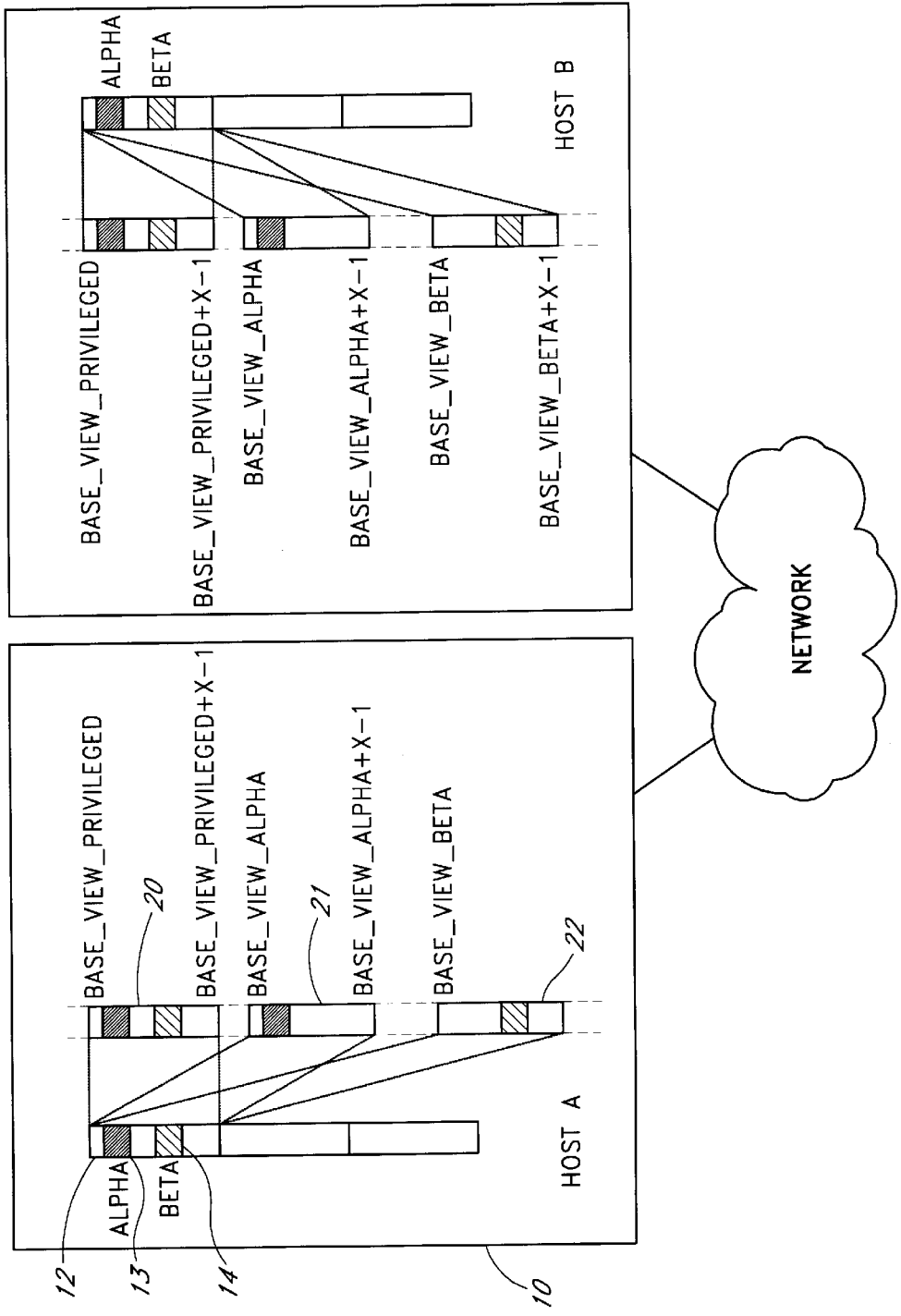
FIG. 4 illustrates a minipage setup with two hosts, according to another embodiment of the invention.

The flowchart of the latter process is depicted in FIG. 2. FIG. 3 depicts the operations performed by the remote host upon receiving a request for a minipage (for which it stores a copy); it uses the privileged view to reply with the requested minipage. Using the privileged view means that minipages are accessed through the appropriate privileged view addresses, regardless of the access permission of the minipage in its associated view. It should be noted that the utilization of privileged view is optional depending upon the particular In the description above it has been assumed, for simplicity, that a memory object is of the size of a page. In general, a memory object may occupy more than one page and the pertinent modifications are described with reference to FIG. 4. In FIG. 4, like member bear the same reference numerals as their corresponding members in FIG. 1.

As before, the memory object is declared during initialization, and then non-overlapping views are mapped to it. Note that each view defines a region of the virtual address space, and this region is of the size of the memory object. Once memory is allocated by the application for a specific data item, it accesses the data item using the view which is associated with the minipage where the memory for the data item is allocated.

However, in the case when the memory object is larger than a page, a view, which is associated with a minipage $m_x$ that resides in page x of the memory object, may also be associated with another minipage $m_y$ that resides in page y of the memory object (where y is different than x). The addresses in the view that are used to access $m_x$ and $m_y$ reside in separate virtual pages, hence each of $m_x$ and $m_y$ may get its own protection by manipulating the access capabilities of the corresponding virtual page. In this way, the consistency protocol may be carried independently for $m_x$ and $m_y$, despite the fact that they are associated with the same view.

Let n denote the number of views constructed during the initialization (excluding the privilege view). When a memory object is of the size of a page, n is the number of minipages in the memory object. By the above observation, when the memory object is larger than a page, n is the maximum number of minipages that reside in a single page of the memory object. Each minipage is associated with a single (virtual) page of one of the views. Preferably, as before, a privileged view is constructed.

When many memory objects are constructed (not shown in FIG. 4), they may be treated independently. A distinct set of views is mapped to each of them, where the sets are non-overlapping. The numbers of views, and the association of minipages with their virtual pages, obey the considerations described above, made independently for each memory object. Preferably, a non-overlapping privileged view is constructed for each memory object.

Having described the mapping of virtual pages to memory objects which are constituted by memory pages, there follows a brief discussion in other types of memory objects, e.g. constituting a file portion.

Thus, implementing a shared file system in granularity of pages suffers from the same drawbacks as shared memory pages discussed above. These drawbacks can be solved using the same technique as described above, by mapping the files to the virtual memory (using the Memory Mapped I/O mechanisms). The fragments of the virtual memory to which the files are mapped are then shared by using the multiple-mapping mechanism as described above. The resulting effect is that the files themselves are shared in a granularity of less than a page size.

For instance, suppose the file F is being used intensively by hosts H1 and H2. H1 uses some portion of it, say F1, and H2 uses another portion of it, say F2. Suppose both F1 and F2 are mapped, even partially, via Memory Mapped I/O, to the same virtual page. This page would then be transferred rapidly between H1 and H2. Now, using the proposed technique of the invention, accessing F1 through one minipage and F2 via another solves the false sharing problem and enables independent processing of F1 and F2.

Figure 5:
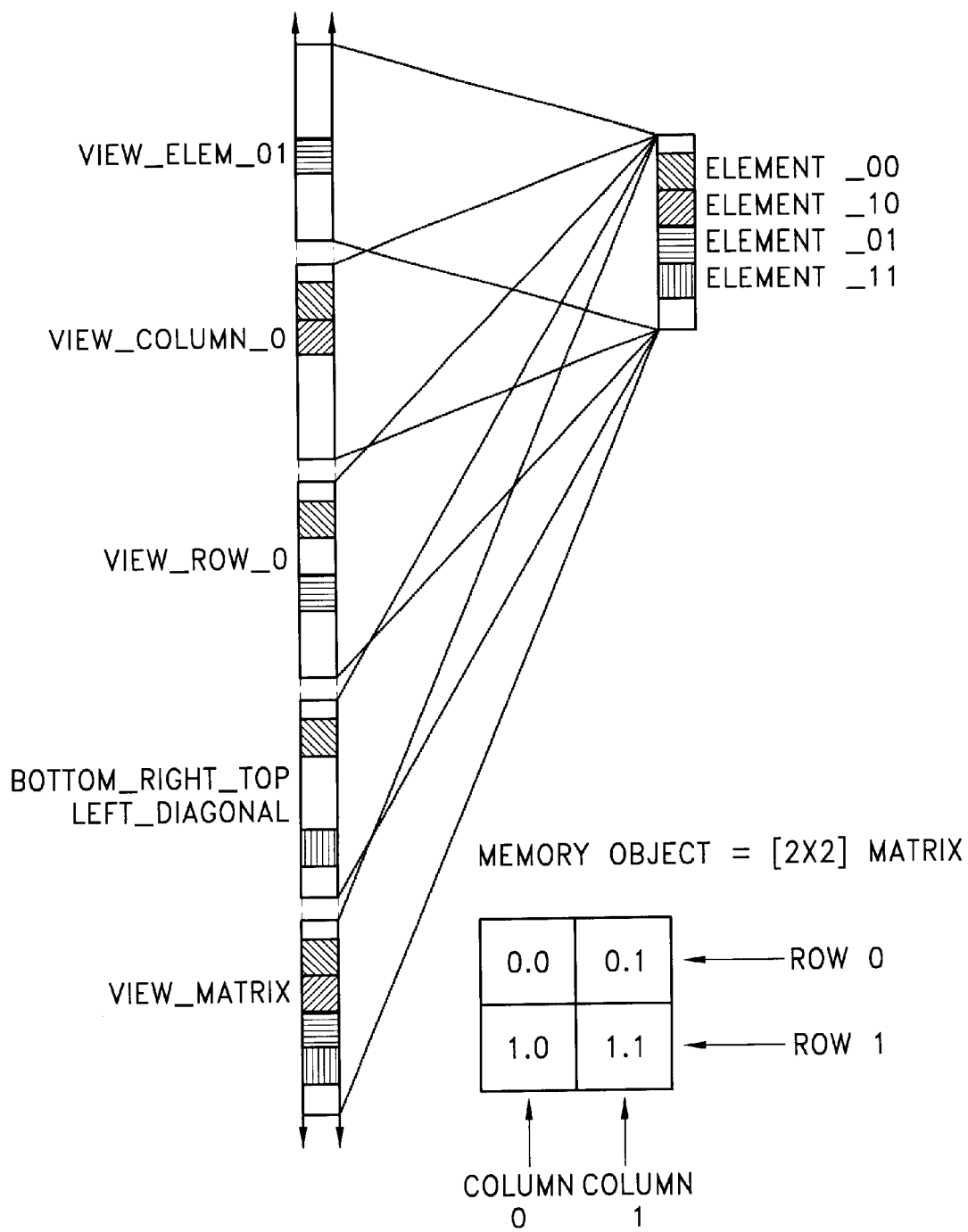
FIG. 5 illustrates an example of 2×2 matrix accessed via several minipages.

There follows a description of yet another example of the invention with reference also to FIG. 5.

Suppose that several minipages are associated with components of a larger (logical) data-item (e.g., the rows of a matrix) and at the same time the larger (logical) data-item is associated with an additional minipage. Then a minipage may be called composed-minipage (constituting one form of minipage of the invention) if the larger data item is associated with it, and in the same time, the components of this data item (one or more of them) are associated with other minipages in other views. Then, this minipage can be used to access the larger data-item in the same way views are used to access data-times in the basic technique.

A data-item can be accessed for read or write only through the composed-minipage when all the minipages, (associated with its components) have the respective permissions. Thus, the access permission of the composed-minipage is always set to the least of the access rights of the minipages of its components (where NoAccess<ReadOnly<ReadWrite). The only difference with respect to e.g. the technique described with reference to FIG. 1, is that a composed-minipage is associated with a set of other minipages which may reside on the same page of the memory object, whereas a (simple) minipage is not associated with any other minipages, but is associated with data items.

An application may opt using minipages and composed-minipages to access the same data-item or its components. A simple minipage can be used when fine granularity is required, and a composed-minipage can be used when coarser granularity is appropriate.

When there is an access exception in an address which is inside a composed-minipage, the handler brings in all the minipages that are associated with that composed-minipage. Afterwards it sets their access permissions, and then exists and lets the computation resume.

In the manner specified it is possible to access hierarchies of data-items (e.g., a multi-dimensional matrix).

FIG. 5 shows a memory-object which stores a 2×2 matrix, and several views that can be used to access the matrix and its components.

According to another aspect of the invention, there is provided a tool to trap memory accesses in either a distributed or even non-distributed system.

After data items are associated with minipages, those minipages can be given NoAccess permission. When a fault occurs, the system can trap access to that data item (which is associated with the minipage where the fault occurred). Then, it can change protection and carry on. Setting the NoAccess permission is used for a one time shot and should be reactivated on a per minipage basis to restart access trapping to this minipage. Access trapping is widely used in monitoring and profiling tools, and also in automatic debugging tools for both single process (single- or multi-threaded) and multi process systems (even distributed). The trapping includes for example logging the access or any other desired action. Accessing includes any one or combination of predetermined permissions, e.g. access, read and write.

Figure 6:
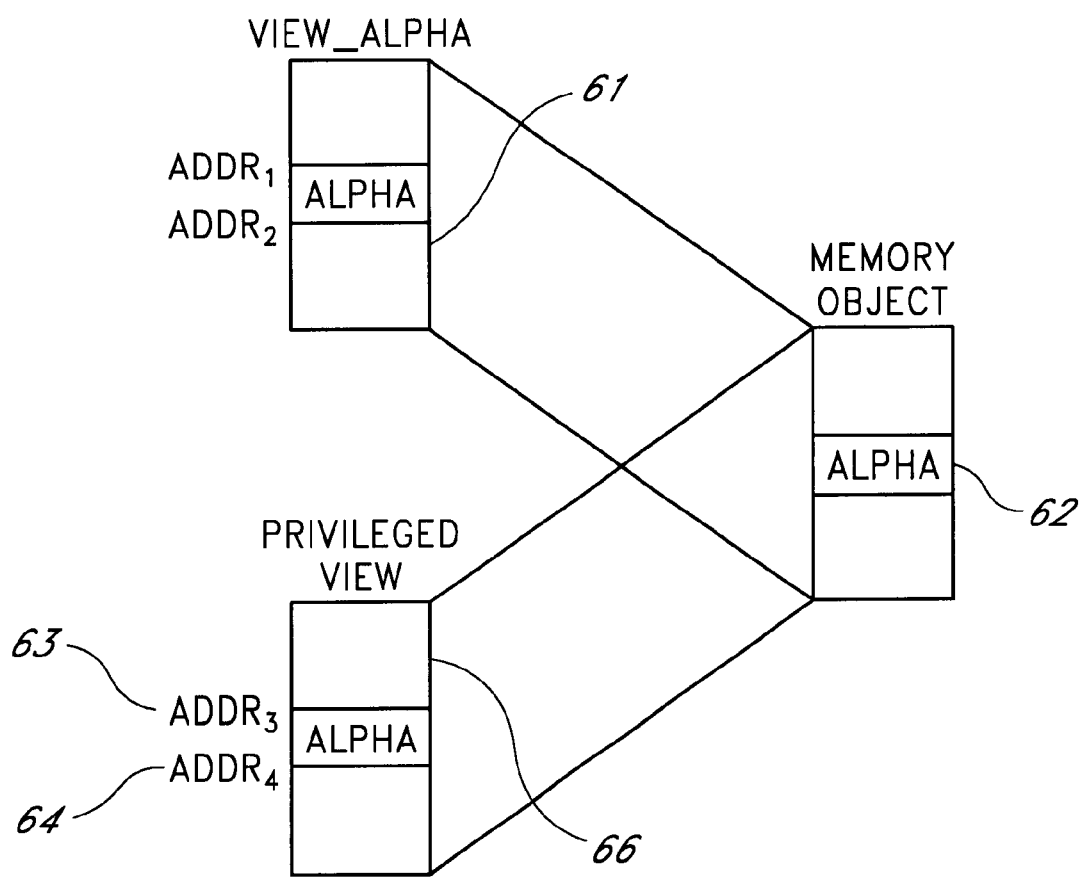
FIG. 6 illustrates an example of atomic update using the privileged view, according to another embodiment of the invention.

According to yet another independent aspect of the invention, there is provided atomic access to data items in a multithreaded system. FIG. 6 describes the steps of an atomic update (65) for a single data item, alpha (62), using two views: an application view (61) and the privileged view (66).

Using the technique mentioned above, the privileged view can be used in the following manner. When one thread is about to modify a data item (62) (or a collection of few data items) in an atomic way, it will set the protection of the minipages, associated with these data items (61), with NoAccess permission. It will then update the data items, using their respective addresses in the privileged view (63) (64). When finished, the access permissions for the minipages can be set to the previous values. If, while the thread was updating the data items, another thread tried to access these data items, it'll fault and will not be allowed to proceed execution before the "atomic" update (65) is finished, and the minipage update is finished. In many cases, the proposed technique can outperform over standard mutual exclusion methods that use a lock or a semaphore, since only the updating thread performs some synchronization operations. If updates are done less frequently than reads, then the proposed technique is beneficial.

The present invention has been described with certain degree of particularity. Those versed in the art will readily appreciate that various modifications and alterations may be carried out without departing from the scope and spirit of the following claims:

What is claimed is:

1. In a Distributed Shared Memory (DSM) system that provides a single address space shared by a number of processes, a method for accomplishing lowered granularity of distributed shared memory, comprising the steps of:

(a) providing said address space as a virtual address space that includes virtual pages;

(b) mapping at least two virtual pages in said virtual address space to the same memory object that includes at least one page, said page includes at least two minipages;

(c) assigning independently, through said virtual pages, access permission to minipages that reside in the same page; and (d) processing independently in different processes minipages that reside in the same page, including:

(i) providing at least one privileged virtual page associated with a respective page of said memory object;

(ii) in the case that there is an up-to-date local copy of said minipage for said given process, altering the permission access to said minipage independent from minipages that reside in the same page; or (iii) in the case that there is no up-to-date local copy for said given process, moving said minipage utilizing said privileged virtual page independent from minipages that reside in the same page.

2. The method of claim 1, wherein said page of memory objects constitute a memory page.

3. The method of claim 1, wherein said page of memory objects constitute a file page.

4. The method of claim 1, wherein said mapping step utilizes a section object.

* * * * *

UNITED STATES PATENT AND TRADEMARK OFFICE
CERTIFICATE OF CORRECTION

PATENT NO.     : 6,263,414 B1                              Page 1 of 1
DATED          : July 17, 2001
INVENTOR(S)    : Itzkovitz et al.

It is certified that error appears in the above-identified patent and that said Letters Patent is hereby corrected as shown below:

<u>Column 10,</u>
Line 53, change "for" to -- of --.

Signed and Sealed this

Seventh Day of May, 2002

Attest:

Attesting Officer

JAMES E. ROGAN
*Director of the United States Patent and Trademark Office*